Dec. 28, 1965　　　J. W. WRIGHT ET AL　　　3,226,605
SOLENOID DAMPING MECHANISM
Filed April 5, 1962
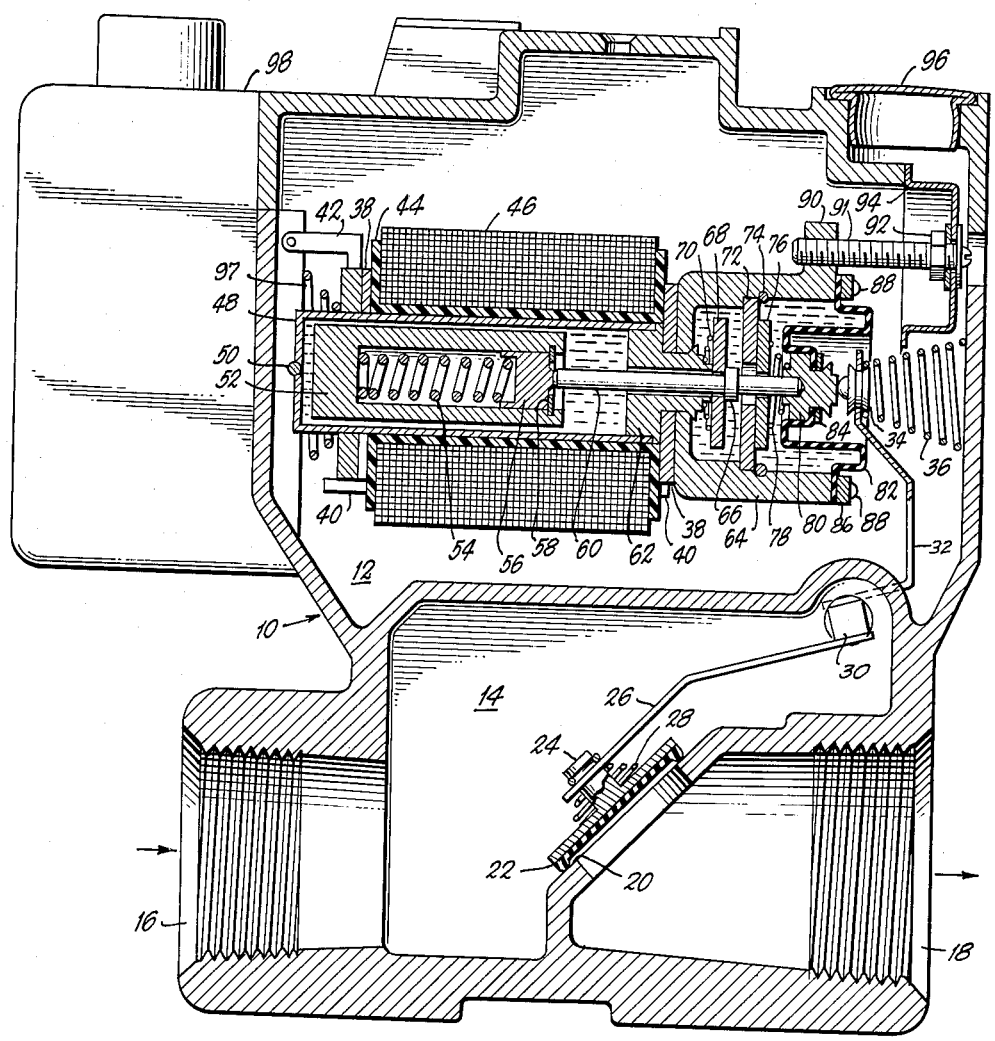
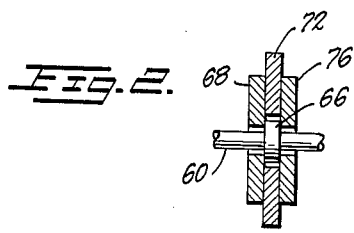
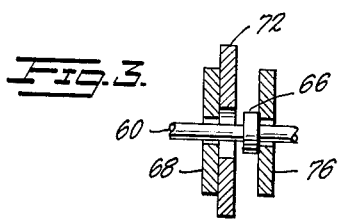

United States Patent Office 3,226,605
Patented Dec. 28, 1965

3,226,605
SOLENOID DAMPING MECHANISM
John W. Wright, Long Beach, Calif., and John C. Hewitt, Jr., deceased, late of Long Beach, Calif., by Dorothy V. Hewitt and Patricia A. Morrison, administratrices, Long Beach, Calif., assignors to Roberts Controls Company, Richmond, Va., a corporation of Delaware
Filed Apr. 5, 1962, Ser. No. 185,478
3 Claims. (Cl. 317—178)

This invention relates to solenoid damping mechanisms and in particular to fluid damping means for retarding movement of a solenoid operator.

It is conventional practice to provide a solenoid with damping means in the form of a dashpot which retards armature movement by forcing a liquid through an orifice to secure the time delay. This results in a relatively linear graduating movement during the time delay, which may be desirable in some applications, but is undesirable in gas burner applications. For example, in a solenoid operated gas valve controlling a flow of gas to a gas burner, the ignition of the burner produces burner flame roll-out and ignition noise on the order of a small explosion.

In the present invention, the damping liquid provides a minimum of movement during a first delaying period and is followed by a relatively rapid controllable movement; such action permits ignition of the gas burner to take place at a subnormal gas input rate and thus decreases ignition noise and burner flame roll-out.

It is therefore an object of this invention to intermittently move the movable element of a dashpot assembly.

Another object of this invention is to furnish an intermediate step to the normal time delay action of a dashpot assembly.

Another object of this invention is to temporarily stop the liquid displacement during the time delaying action of a dashpot assembly.

It is another object of this invention to impede the gradual movement of an armature plunger in a solenoid dashpot assembly.

This invention has another object in that the valve operator in a solenoid valve is actuated with a stepped movement.

A further object of this invention is to step both the opening and closing movements of the valve operator in a solenoid valve.

In practicing this invention, a liquid dashpot housing is secured to a solenoid assembly to furnish normal time delay in the movement of the solenoid armature. The dashpot housing includes separable plate elements which are juxtaposed to arrest the dashpot action and temporarily halt the armature movement and which are separated from each other to reinitiate the dashpot action and permit the armature movement to continue.

Other objects and advantages of the present invention will become apparent from the following description taken in connection with the accompanying drawing wherein:

FIG. 1 is a longitudinal section through a solenoid operated valve embodying this invention;

FIG. 2 is a schematic diagram showing the dashpot delaying means of FIG. 1 in an intermediate position; and
FIG. 3 is a schematic diagram similar to FIG. 2 but showing another position corresponding to a valve open position.

As is illustrated on the drawing, a housing 10 includes an upper solenoid section 12 and a lower valve section 14. The valve section 14 has an inlet 16 and an outlet 18 separated by an aperture, sloping partition defining a valve seat 20. A flow of gas through the chamber of the valve section 14 is controlled by an annular valve member 22 movable relative to the valve seat 20. A stem 24 on the valve member is resiliently carried by one end of a valve lever 26 by means of a coil spring 28 mounted in compression between the rear face of valve member 22 and the end portion of lever 26. The opposite end of lever 26 is fixed to a flat end of a fulcrum rod 30, the central cylindrical portion of which is rotatably disposed in a suitable bore extending through the housing wall separating the chambers 12 and 14. A gas seal is effected by means of an O-ring seal (not shown) carried by the cylindrical portion of the rod 30. The other end of rod 30 extends into the solenoid chamber 12 and has a similarly flattened end which is secured to a second lever 32. Thus, the movement of lever 32 causes rotation of the fulcrum rod 30 which in turn causes lever 26 to actuate the valve member 22. The actuating end 34 of lever 32 is engaged by a coil spring 32 mounted in compression between a wall of housing 10 and the lever end 34, which acts through the rod 30 and lever 26 to bias the valve member 22 toward the valve seat 20.

A generally rectangular solenoid mounting frame 38 has its lower edges resting on suitable ledges 40 (only one being shown) formed on the internal wall of housing 10. A plurality of spring clips 42 (only one being shown) is suitably fastened as by screws to another ledge on the internal wall of housing 10 in such a position as to engage the upper edges of frame 38. The spring clips 42 prevent vertical movement of the frame 38 but do not interfere with horizontal movement thereof from left to right and vice versa as viewed in FIG. 1. The mounting frame 38 is open at its top and bottom and carries a spool 44 made of any suitable insulating material, such as plastic. A solenoid coil 46 is wound on the plastic spool 44 with its leads (not shown) extending through the housing 10 in any suitable manner. A cylindrical armature casing 48 has a closed end carried by the mounting frame 38 and extending through the center of the plastic spool 44. The closed end of casing 48 contains an oil fill plug 50 for filling with a damping liquid as will be apparent hereinafter.

A generally hollow cylindrical armature 52 is disposed in the armature casing 48 for movement in an axial direction relative to the electromagentic coil 46 in response to magnetic flux of the coil 46. The central bore of the armature 48 contains a loading spring 54 in the form of a coil spring mounted in compression between a bottom wall shoulder and a reciprocable plunger plug 56 which is retained in the armature bore as by a stop ring 58 staked in the open end of armature 48. Motion transmitting means in the form of an actuating plunger rod 60 has one end extending through the central aperture of stop ring 58 so as to be in engagement with the reciprocable plug 56.

The plunger rod 60 extends freely through a central enlarged bore in a guide bushing 62 which has one end portion secured to the end of armature casing 48 as by brazing. The guide bushing 62 is axially aligned with the armature 52 and acts as a stop for the armature 52. The guide bushing 62 extends through the mounting frame 38 and an aligned opening in the bottom wall of a cup-shaped dashpot housing 64 and the central bore of guide bushing 62 establishes communication between the dashpot housing 64 and the armature casing 48. The housing 64 is secured to the frame 38 by a spinning operation on the opposite end of guide bushing 62, which provides an oil seal. With such an arrangement, the dashpot housing 64, the frame 38 and the solenoid assembly are secured together for unitary movement along the supporting ledges 40.

The portion of the plunger rod 60 that is disposed in the dashpot housing 64 is provided with an annular collar 66. A stage closing disc element 68 is mounted on the plunger rod 60 on the solenoid side of the collar 66 by means of a central disc aperture which is slightly larger than the plunger rod 60 to permit free relative movement therebetween. A coil spring 70 mounted in compression between the disc 68 and the end of guide bushing 62 biases the disc 68 into engagement with the collar 66 for following the axial movement thereof. An annular fixed plate member 72 is mounted against an internal annular shoulder intermediately positioned in the dashpot housing 64 and is held in place by a snap ring 74 fitting into a suitable annular groove. The thickness of the fixed plate 72 is the same as the thickness of the annular collar 66 which freely passes through a central opening in the fixed plate 72. A stage opening disc element 76 is mounted on the plunger rod 60 on the side of the collar 66 and on the side of the fixed plate 72 opposite the solenoid; similarly, a central disc aperture which is slightly larger than the plunger rod 60 permits free relative movement between the disc 76 and the plunger rod 60. The disc 76 is biased toward the collar 66 to follow the axial movement thereof by means of a coil spring 78 mounted in compression between the disc 76 and a pressure button 80 to which the end of plunger rod 60 is attached for unitary movement. The pressure button 80 engages the actuating end 34 of lever 32 and is part of a diaphragm actuator means which includes a flexible membrane 82 having a central portion secured to a shoulder on the pressure button 80 by a washer 84 which is staked in place to secure an oil seal. The periphery of the flexible membrane 82 is mounted on the end of dashpot housing 64 by means of a sealing plate 86 and screws 88 to form a sealed closure for the dashpot housing 64.

The dashpot housing 64 has a raised base extension 90 suitably bored and threaded to receive an adjusting screw 91 which has a head portion abutting an inner wall of the housing 10 by means of a calibrating dial 94. Calibration of the dial 94 in respect to screw position is accomplished by means of a nut 92 on the screw 91 holding the dial in place against an annular shoulder on the end of the screw 91; a removable cap 96 permits reading of the calibration dial 94 through the housing 10. An aperture in the housing 10 adjacent the screw 91 permits inserting a suitable tool for rotating the screw 91. Since the screw 91 is prevented from axial movement, the rotation of the screw 91 and its dial 94 so as to move the dashpot housing 64, frame 38 and the solenoid assembly to the left as viewed in FIG. 1, compresses the loading spring 97 and decreases the opening of the valve member 22 at its staging position. Rotation of the screw 91 so as to allow the loading spring 97 to move the entire assembly to the right increases the opening of the valve member 22 at its staging position. This is due to the fact that the amount of stage opening of the valve member 22 is determined by the distance between the fixed plate 72 and the actuating end 34 of lever 32 when the valve member 22 is closed. This feature allows the valve member 22 to be adjustably set for a particular burner so that the step or stage opening and closure is such that the reduced input to the burner at the stage position is within the range at which the gas burner will operate properly.

After assembly of the solenoid and dashpot housing components, a vacuum is drawn on the system and the armature casing 48 and dashpot housing 64 filled with a damping liquid through the fill plug 50. The damping liquid is preferably a silicone oil having a relatively stable viscosity with respect to temperature.

An automatic pilot component 98 may be added to the housing 10 as by screws either during manufacture or in the field. The automatic pilot component 98 includes the usual reset button for assuring safe lighting of a pilot burner in proximity to the main burner.

As illustrated in FIG. 1, the control device is in the OFF position wherein the valve member 22 is closed and the solenoid coil 46 is deenergized. The coil 46 may be energized by any suitable control circuit, for example, a circuit including a space thermostat which closes on a demand for heat in the space to be heated by the gas burner. Upon such energization, the magnetic flux moves the armature 52 to the right against the stop on the guide bushing 62, in which position the armature 52 develops its maximum power. Armature movement causes the plunger rod 60 to move freely to the position where its annular collar 66 contacts the stage opening disc 76 where its movement is stopped; this represents the staging position as shown in FIG. 2. The movement of the plunger rod 60 is transmitted through the flexible membrane 82 and pressure button 80 to the valve operating lever 32 to produce the stage opening of the valve member 22. As the oil is displaced into the dashpot housing 64, the stage opening disc 76 resists being moved away from the fixed plate 72 due to the orifice effect between their adjacent faces. The movement of plunger rod 60 is restricted until the liquid flow between the faces of the plate 72 and disc 76 allows sufficient spacing so that the orifice restricting character of the disc spacing becomes negligible. At the staging position, the plunger plug 56 is forced against the loading spring 54 compressing it within the armature 52. The loading spring 54 continues to deliver the force necessary to separate the stage opening disc 76 from the fixed plate 72 so that after the time delay caused by the disc and fluid action, the plunger rod 60 continues its movement to the right with a rapid action. Such movement fully separates the disc 76 from the fixed plate 72, as shown in FIG. 3, because of the annular collar 66 and fully opens the valve member 22.

As soon as the gas burner supplies sufficient heat to the space, the thermostat becomes satisfied and the control circuit is opened. The resulting deenergization of the solenoid coil 46 causes a loss of magnetic flux so there is no magnetic force to hold the armature against the stop on the guide bushing 62. Accordingly, the valve lever loading spring 36 acts to return the valve member 22 to its stage closing position and the discs 68 and 76 are disposed adjacent opposite sides of the fixed plate 74 as shown in the staging position of FIG. 2. The time delay acts in the same manner as described above for the stage opening. After the stage closing delay, the disc 68 is separated from the fixed plate 72 by the annular collar 66 on the plunger rod 60 and the operating elements are returned to their fully OFF position as shown in FIG. 1.

The stage opening and stage closing of the valve member 22 results in the same position relative to the valve seat 20 due to the fact that the annular collar 66 has the same thickness as the fixed plate 72. Thus, it is apparent that an annular collar 66 of less thickness than the fixed plate 72 may be used and by axially shifting its position on the plunger rod 60, a stage opening and stage closing of varying degree can be secured. The intermediate step between fully opened and fully closed positions of the gas control valve with a time delay at this step reduces ignition noise during opening and reduces extinction noise during closing of the valve member. With such an arrangement, the stage opening can be set to provide sufficient opening of the gas valve for good burner ignition without sufficient burner orifice pressure to cause initial overgassing. After ignition is secured, a sufficient time delay is desired before further opening of the gas valve in order to obtain a stable burner flame. The gas valve is then opened with a rapid movement that does not interfere with the stability of the burner flame.

In conventional dashpot arrangement, it is known that the effect of foreign material in the fluid attempting to pass through a relatively small orifice can lengthen the time delay or even stop the dashpot action so as to make the device inoperative. In the present invention, foreign material between the separable elements has very little effect upon the orifice restricting character of the space between the faces of the elements.

The time delay at the staging position of the disc element may be varied by varying the minimum spacing therebetween as by raised bosses on adjacent faces of the disc element which may be increased or decreased to obtain the desired control.

Inasmuch as the present invention is subject to many modifications and various changes in detail, it is intended that the foregoing description of the preferred embodiment shown in the drawings shall be interpreted as illustrative and not in a limiting sense.

What is claimed is:

1. In a solenoid assembly for operating a valve, the combination comprising a cylinder open at one end, a coil surrounding said cylinder and an armature movably disposed in said cylinder, a dashpot housing fixed to said cylinder and having one end communicating with the open end of said cylinder and an opposite end sealed by a diaphragm actuator, a quantity of damping liquid filling said cylinder and said housing, an apertured plate member fixed in said housing, a plunger element extending through said plate member and mounted between said armature and said diaphragm actuator to transmit motion therebetween, a pair of disc elements on opposite sides of said plate member and cooperating therewith to retard displacement of the damping liquid from one side of said plate member to the other, and means on said plunger element moving one of said disc elements away from said plate member to permit displacement of the damping liquid from the said one side of said plate member to the other.

2. The combination as recited in claim 1 wherein said apertured plate member includes a centrally disposed aperture and said means on said plunger element includes a collar fixed thereon for movement through said centrally disposed aperture.

3. In a solenoid assembly for operating a valve, the combination comprising a housing having a solenoid chamber and valve operating means therein, a supporting frame resiliently mounted in said solenoid chamber, a cylinder fixed to said frame and being open at one end, a solenoid coil surrounding said cylinder, an armature movably disposed in said cylinder, a dashpot housing secured to said frame and having a diaphragm actuator operatively connected to said valve operating means, bushing means in the open end of said cylinder establishing communication between said dashpot housing and said cylinder, a plunger extending through said bushing means and having one end operatively connected to said diaphragm actuator and another end operatively connected to said armature to transmit motion therebetween, a damping liquid filling said cylinder and said dashpot housing and being displaceable therebetween to retard movement of said plunger, a centrally apertured plate fixed in said dashpot housing, a first disc biased toward one side of said plate to restrict flow of said damping liquid therebetween whereby movement of said plunger in one direction is temporarily delayed, a second disc biased toward an opposite side of said plate to restrict flow of said damping liquid therebetween whereby movement of said plunger in an opposite direction is temporarily delayed, and a collar fixed to said plunger for movement therewith through said centrally apertured plate for alternate engagement with said first and second discs for separating the same from said plate whereby unrestricted flow of said damping liquid permits continued movement of said plunger.

References Cited by the Examiner

UNITED STATES PATENTS

| | | | |
|---|---|---|---|
| 1,152,433 | 9/1915 | Murphy | 200—34 |
| 2,920,254 | 1/1960 | Ray | 317—191 |
| 2,986,369 | 5/1961 | Flagg | 251—54 |
| 2,988,675 | 6/1961 | Bancroft | 317—191 |
| 3,017,156 | 1/1962 | Lemberger | 251—54 |
| 3,036,808 | 5/1962 | Fox | 251—54 |
| 3,098,635 | 7/1963 | Delaporte et al. | 251—54 |

FOREIGN PATENTS 524,799  4/1955  Italy.

JOHN F. BURNS, *Primary Examiner.*

WILLIAM F. ODEA, LARAMIE E. ASKIN, E. JAMES SAX, *Examiners.*